United States Patent [19]

Llort et al.

[11] Patent Number: 4,971,329

[45] Date of Patent: Nov. 20, 1990

[54] SOLID GOLF BALL

[75] Inventors: Francisco M. Llort, Dighton; Manuel R. Jerome, Jr., New Bedford, both of Mass.

[73] Assignee: Acushnet Company, New Bedford, Mass.

[21] Appl. No.: 448,675

[22] Filed: Dec. 11, 1989

[51] Int. Cl.$^5$ .................... A63B 37/00; A63B 37/06
[52] U.S. Cl. .................... 273/218; 273/220; 260/998.14; 524/908; 525/236
[58] Field of Search .................... 273/218, 230, 220; 524/423, 908; 260/998.14

[56] References Cited

U.S. PATENT DOCUMENTS

| | | |
|---|---|---|
| 4,683,257 | 7/1987 | Kakiuchi et al. |
| 4,692,497 | 9/1987 | Gendreau et al. |
| 4,715,607 | 12/1987 | Llort et al. ...................... 524/908 |

*Primary Examiner*—Allan M. Lieberman
*Attorney, Agent, or Firm*—Lucas & Just

[57] ABSTRACT

The solid golf ball is made from a polybutadiene admixture of cis-1,4 polybutadiene and 1,2 polybutadiene; a metal salt of an unsaturated carboxylic acid; an inorganic filler; and a free radical initiator. The admixture has about 99.5% to about 95% by weight of cis-1,4 polybutadiene and about 0.5% to about 5% by weight of 1,2 polybutadiene. The cis-1,4 polybutadiene is made from about 80% to about 100% by weight of cis-1,4 polybutadiene with a cis-1,4 content of 95% and about 0% to about 20% by weight of a cis-1,4 polybutadiene with a cis-1,4 content of about 98%.

12 Claims, No Drawings

SOLID GOLF BALL

This invention relates to golf balls and, more particularly, to a solid golf ball made with an admixture of cis-1,4 polybutadiene and 1,2 polybutadiene.

On the market today there are three main types of golf balls, namely one-piece, two-piece and wound. One-piece balls are made of a homogeneous mass of rubber material. Two-piece balls are made by molding a cover about a core, while wound balls are made by winding elastic thread about a center to form a wound core and then molding a cover about the wound core. A center is either a solid mass of a rubber material or a liquid-filled envelope.

As used in the industry, the term "solid golf ball" refers to a ball that does not have any windings, i.e. is either a unitary one-piece ball or a multiple-piece ball such as a solid core with a separate cover.

Solid golf balls made from cis-1,4 polybutadiene have a cis-1,4 polybutadiene content of 40% or more. The polybutadiene is typically cross-linked with a metal salt of an unsaturated carboxylic acid such as zinc dimethacrylate or zinc diacrylate (often referred to as "zinc methacrylate" or "zinc acrylate"). A free radical initiator such as dicumyl peroxide is used to react the cross-linking agent with the polybutadiene.

These solid golf balls have been plagued by poor durability, one-piece golf balls are typically not able to withstand more than 50 hits with a machine that simulates the impact of a driver as used by a live golfer.

It has been suggested that a blend of two cis-1,4 polybutadienes be employed, each having different Mooney viscosities, to improve the resilience of a solid golf ball, see U.S. Pat. No. 4,683,257 issued July 28, 1987.

Applicants have now discovered that adding a small amount of 1,2 polybutadiene to the cis-1,4 polybutadiene results in a durable solid golf ball. That a solid golf ball made in accordance with the present invention is more durable than a solid golf ball made with a conventional formulation containing cis-1,4 polybutadiene without 1,2 polybutadiene is surprising and unexpected because cis-1,4 polybutadiene contains trace amounts of 1,2 linkages. It is also surprising because a solid golf ball made by substituting 1,2 polybutadiene for the cis-1,4 polybutadiene is unpractical due to problematic processing of the 1,2 polybutadiene.

The solid golf ball of the present invention comprises a polybutadiene admixture of cis-1,4 polybutadiene and 1,2 polybutadiene; a metal salt of an unsaturated carboxylic acid; an inorganic filler; and a free radical initiator.

In accordance with the present invention, the polybutadiene admixture has about 99.5% to about 95% by weight based on the total weight of polybutadiene in the admixture of cis-1,4 polybutadiene and about 0.5% to about 5% by weight of 1,2 polybutadiene. More preferably, the polybutadiene admixture has about 99.5% to about 96.5% by weight of cis-1,4 polybutadiene and about 0.5% to about 3.5% by weight of 1,2 polybutadiene. Even more preferred is a polybutadiene admixture having about 99.5% to about 98.5% by weight of cis-1,4 polybutadiene and about 0.5% to about 1.5% by weight of 1,2 polybutadiene.

The cis-1,4 polybutadiene used in the present invention has a cis-1,4 content of about 40% or more and, more preferably, a cis-1,4 content of about 90% and above. It is even more preferred that the cis-1,4 polybutadiene used in the present invention have a cis-1,4 content of about 95% and above. Preferably, the 1,2 polybutadiene has a 1,2 polybutadiene content of 90% or above.

The amount of polybutadiene admixture in the solid golf ball of the present invention is preferably about 90 to about 100 parts by weight based on 100 parts by weight rubber (phr) in the solid golf ball. More preferably, the polybutadiene admixture makes up about 95 to about 100 phr of said solid golf ball. The remaining rubber component can be a natural rubber or a synthetic rubber. The natural or synthetic rubber, if used, is preferably present in an amount between about 0 to about 10 phr and, more preferably, about 0 to about 5 phr.

Preferably, the solid golf ball of the present invention comprises about 90 to about 100 phr of a polybutadiene admixture of cis-1,4 polybutadiene and 1,2 polybutadiene; about 10 to about 0 phr of a natural rubber; about 20 to about 45 phr of a metal salt of an unsaturated carboxylic acid; about 0 to about 40 phr of an inorganic filler; and about 0.1 to 10 phr of a free radical initiator.

Preferably, up to about 40 phr of an inorganic filler, such as zinc oxide, barium sulfate or titanium dioxide, is added to adjust the final weight of the solid golf ball. More preferably, between about 10 to about 25 phr of inorganic filler is added to the solid golf ball.

Good results have been obtained when two different cis-1,4 polybutadienes are used to make up the total amount of cis-1,4 polybutadiene in the solid golf ball. Preferably, the cis-1,4 polybutadiene content of the solid golf ball of the present invention is made up of about 80% to about 100% by weight based on the total weight of cis-1,4 polybutadiene having a cis-1,4 polybutadiene content of about 95%; and about 0% to about 20% by weight of a cis-1,4 polybutadiene having a cis-1,4 polybutadiene content of about 98% or above. More preferably, the cis-1,4 polybutadiene of the solid golf ball of the present invention is made up of about 85% by weight of a cis-1,4 polybutadiene having a cis-1,4 polybutadiene content of 95% and about 15% by weight of a cis-1,4 polybutadiene having a cis-1,4 polybutadiene content of 98% or above.

Cis-1,4 polybutadiene having a cis-1,4 polybutadiene content of about 95% is conventionally prepared by polymerizing butadiene monomers in the presence of a titanium- or cobalt-containing catalyst, while cis-1,4 polybutadiene having a cis-1,4 polybutadiene content of 98% or above is prepared by polymerizing butadiene monomers in the presence of a neodymium containing catalyst.

Cis-1,4 polybutadiene having a cis-1,4 polybutadiene content of about 95% or above is commercially obtainable from Mobay under the trade name Buna CB11 and from Shell under the trade name Shell 1220. Cis-1,4 polybutadiene having a cis-1,4 polybutadiene content of about 98% or above is commercially available from Enichem under the trade name Europrene.

With respect to 1,2 polybutadiene having a 90% 1,2 polybutadiene content, this material can be obtained from Colorado Chemical under the trade name Ricon 154D.

The metal salt of an unsaturated carboxylic acid is thought to cross-link the components of rubber. Suitable carboxylic acids include methacrylic, acrylic, cinnamic and crotonic acid, with methacrylic and acrylic being preferred. Suitable metal ions include sodium, potassium, magnesium, cerium, zinc and cadmium, with sodium and zinc being preferred. The most preferred metal salts of the unsaturated carboxylic acids are zinc dimethacrylate and zinc diacrylate.

Suitable free radical initiators include peroxides such as dicumyl peroxide, α, α'-bis (t-butylperoxy)diisopropylbenzene and 1,1-di (t-butylperoxy)-3,3,5-trimethyl cyclohexane. Preferably, the free radical initiator is a combination of at least two free radical initiators, as taught in U.S. Pat. No. 4,692,497 issued Sept. 8, 1987. The teachings of the '497 patent are incorporated herein by reference.

In forming a solid golf ball in accordance with the present invention, all rubber components and the cross-linking agent are mixed together. When these components are initially mixed together, the temperature of the mixture rises. The mixing is continued until good dispersion is achieved as indicated by reaching a temperature of about 225°–325° F. (107°–163° C.). This is typically accomplished in about 3 to 30 minutes. Once the mixing is completed, the admixture is cooled to below the decomposition temperature of the free radical initiators. Then the initiators are added to the mixture and the mixture is again mixed for 2 to 15 minutes to get a good dispersion of the two radical initiators in the mix. The mix is then suitably milled into slabs or extruded into rods from which pieces are cut slightly larger and heavier than the desired solid golf ball. These pieces are then placed into a heated golf ball mold and cured at elevated temperature under pressure. A temperature of about 280°–320° F. (138°–160° C.) for a period of about 15 to 30 minutes has been found to be suitable. The pressure is not critical as long as it is sufficient to prevent the mold from opening during the curing step.

The composition of the present invention is especially useful for making unitary one-piece golf balls or cores of two-piece golf balls.

These and other aspects of the present invention may be more fully understood with reference to the following examples.

EXAMPLE 1

One-piece golf balls were made in accordance with the present invention having the components listed in Table I below:

TABLE I

| Component | Amount | |
|---|---|---|
| Cis-1,4 polybutadiene (96% cis-1,4) | 99.0% | 96.0 phr |
| 1,2 polybutadiene (90% 1,2) | 1.0% | |
| Natural rubber | 4.0 phr | |
| Zinc diacrylate | 30.0 phr | |
| Zinc oxide | 13.7 phr | |
| SR-351 (processing aid) | 1.5 phr | |
| Free radical initiators | 0.53 phr | |

The cis-1,4 polybutadiene was obtained from Shell under the name Shell 1220. Conventional natural rubber was used. The zinc diacrylate was obtained from Sartomer Chemical Co. under the name Chemlink RT. SR-351 is trimethylol propane triacrylate and is sold by Sartomer Chemical Co. The free radical initiators were 0.1 phr of Vulcup R, α, α'-bis(t-butylperoxy)diisopropyl benzene, which is commercially available from Hercules and 0.43 phr of Varox 231XL, 1,1-di (t-butylperoxy)-3,3,5-trimethyl cyclohexane, which is commercially available from Vanderbilt.

All components, except for the free radical initiators, were mixed together. The temperature of the mixture rose during mixing and mixing was continued until good dispersion was achieved. The mixture reached a temperature of about 250° F. (120° C.) which was accomplished in about 8 minutes. Once the mixing was completed, the admixture was cooled to below the decomposition temperature of the free radical initiators. Then the initiators were added to the mixture and the mixture was again mixed for 2 minutes to get a good dispersion of the two free radical initiators in the mix. Mixing was conducted in a Shaw Intermix mixer. The mix was then milled into slabs from which pieces were cut slightly larger and heavier than a one-piece golf ball. These pieces were then placed into a heated golf ball mold and cured at elevated temperature under pressure. A temperature of about 320° F. (160° C.) for a period of about 15 minutes was used. The pressure was sufficient to prevent the mold from opening during the curing step.

EXAMPLE 2

Golf balls made in accordance with Example 1 above were tested for durability against commercially available two-piece golf balls having a Surlyn ® cover.

The commercial golf balls were Pinnacle balls sold by Acushnet Company. The Pinnacle is a two-piece ball having a cover made from Surlyn ®.

Durability was tested by hitting the golf balls using a dual pendulum machine having two revolving arms which revolved at a rate of 454 rpm. The face plate that hit the balls made an angle of 15° with the vertical. The face plate simulated the head of a driver with box grooves. One dozen balls of each type, present invention and Pinnacle, were tested. At about 500 hits, one or more of the Pinnacle balls showed cracks in the Surlyn ® cover, while the one-piece golf balls of the present invention did not show any cracks.

It will be understood that each and every numerical value which appears in the claims herein is modified by the term "about" if the modifying term "about" does not appear in front of such numerical value.

It will be understood that the claims are intended to cover all changes and modifications of the prefered embodiments of the invention herein chosen for the purpose of illustration which do not constitute a departure from the spirit and scope of the invention.

What is claimed is:

1. A solid golf ball comprising a polybutadiene admixture of cis-1,4 polybutadiene and 1,2 polybutadiene; a metal salt of an unsaturated carboxylic acid; an inorganic filler; and a free radical initiatior and wherein said polybutadiene admixture comprises about 99.5% to about 95% by weight of cis-1,4 polybutadiene having a cis-1,4 content of about 40% or above and about 0.5% to about 5% by weight of 1,2 polybutadiene having a 1,2 polybutadiene content of about 90% or above.

2. The golf ball of claim 1 wherein the cis 1,4polybutadiene content is about 90% or above.

3. The solid golf ball of claim 1 wherein said cis 1,4 polybutadiene is a mixture of about 80% to about 100% by weight of a cis-1,4 polybutadiene having a cis-1,4 polybutadiene content of about 95% and about 0% to about 20% by weight of a cis-1,4 polybutadiene having a cis-1,4 polybutadiene content of about 98%.

4. The golf ball of claim 1 wherein said metal salt of an unsaturated carboxylic acid is zinc dimethacrylate or zinc diacrylate.

5. The golf ball of claim 1 wherein the inorganic filler is zinc oxide, barium sulfate or titanium dioxide.

6. A golf ball comprising about 90 to about 100 phr of a polybutadiene admixture, said admixture comprising about 99.5% to about 95% by weight of cis-1,4 polybutadiene having a cis-1,4 polybutadiene content of about 90% or above and about 0.5% to about 5% by weight of 1,2 polybutadiene having a 1,2 polybutadiene content of about 90; about 0 to about 10 phr of a natural rubber; about 20 to about 45 phr of a metal salt of an unsaturated carboxylic acid; about 0 to about 45 phr of an inorganic filler; and about 0.1 to about 10 phr of a free radical initiator.

7. The solid golf ball of claim 6 wherein said cis-1,4 polybutadiene is a mixture of about 80% to about 100% by weight of a cis-1,4 polybutadiene having a cis-1,4 polybutadiene content of about 95% and about 0% to about 20% by weight of a cis-1,4 polybutadiene having a cis-1,4 polybutadiene content of about 98%.

8. The golf ball of claim 6 wherein the cis-1,4 polybutadiene content is about 90% or above.

9. The golf ball of claim 6 wherein the inorganic filler is zinc oxide, barium sulfate or titanium dioxide.

10. A solid golf ball product comprising:
    (a) about 95 to about 100 phr of a polybutadiene admixture comprising:
        (a') about 99.5% to about 98.5% by weight of cis-1,4 polybutadiene, said cis-1,4 polybutadiene comprising:
            (i) about 80% to about 100% by weight of a cis-1,4 polybutadiene having a cis-1,4 polybutadiene content of about 95%; and
            (ii) about 20% to about 0% by weight of a cis-1,4 polybutadiene having a cis-1,4 polybutadiene content of about 98%; and
        (a') about 0.5% to about 1.5% by weight of 1,2 polybutadiene having a 1,2 polybutadiene content of about 90%;
    (b) about 5 to about 0 phr of a natural rubber;
    (c) about 25 to about 40 phr of a metal salt of an unsaturated carboxylic acid;
    (d) about 0 to about 45 phr of an inorganic filler; and
    (e) about 0.1 to about 10 phr of a free radical initiator.

11. The golf ball of claim 10 wherein said metal salt of an unsaturated carboxylic acid is zinc dimethacrylate or zinc diacrylate.

12. The golf ball of claim 11 wherein the inorganic filler is zinc oxide, barium sulfate or titanium dioxide.

* * * * *

UNITED STATES PATENT AND TRADEMARK OFFICE
CERTIFICATE OF CORRECTION

PATENT NO. : 4,971,329

DATED : November 20, 1990

INVENTOR(S) : Francisco M. Llort et al.

It is certified that error appears in the above-identified patent and that said Letters Patent is hereby corrected as shown below:

Column 4, line 51, change "initiatior" to --initiator--.

Column 5, line 9, after "90" insert --% or above--.

Column 6, line 12, change "(a')" to --($a^2$)--.

Signed and Sealed this

Nineteenth Day of January, 1993

Attest:

DOUGLAS B. COMER

Attesting Officer

Acting Commissioner of Patents and Trademarks